May 5, 1959 W. HAASE ET AL 2,884,692
METHOD OF MAKING A TWISTED WIRE WELDING ELEMENT
Filed July 6, 1956 3 Sheets-Sheet 3
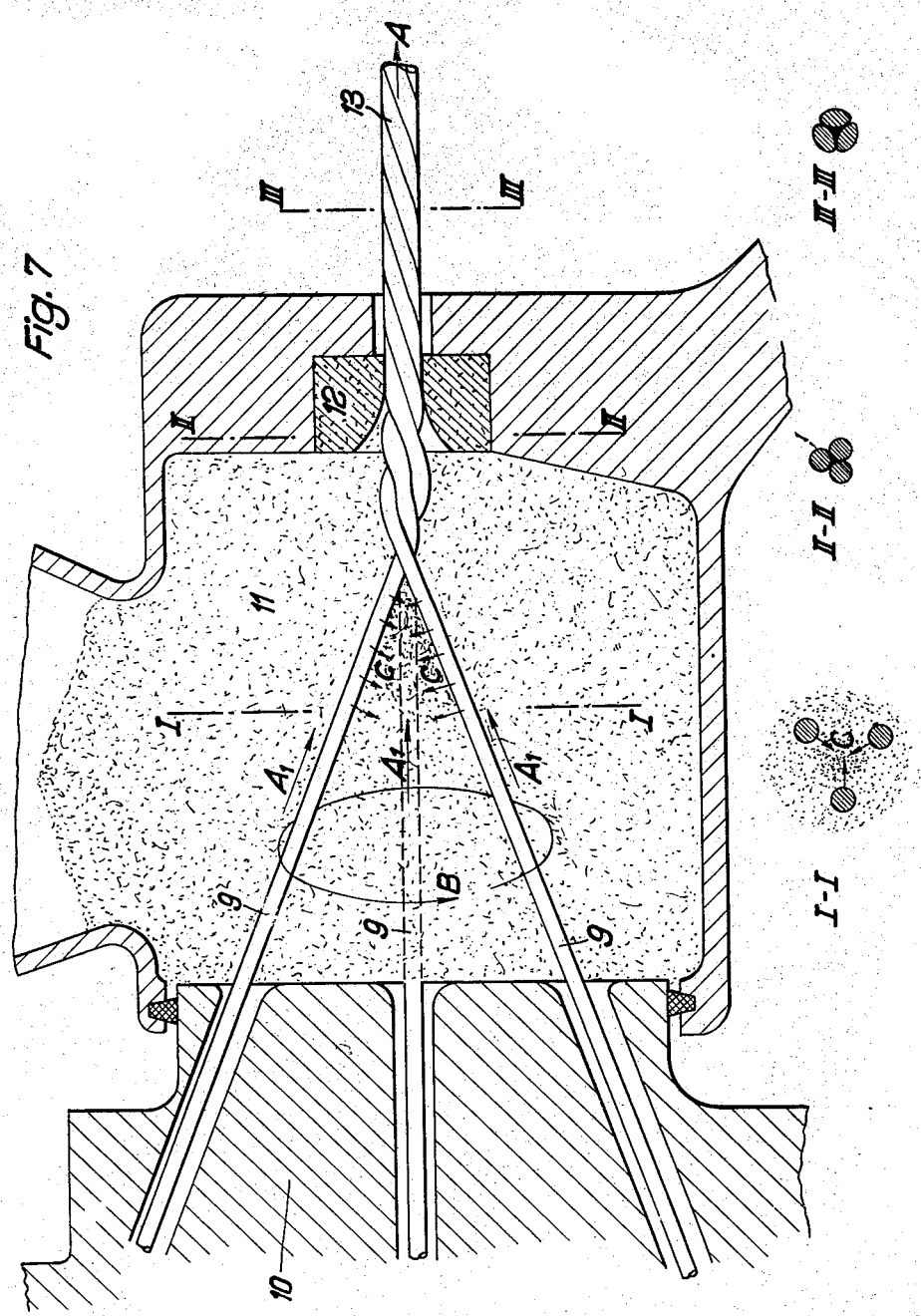
Inventors
Walter Haase
Alfred Schüssler
By Bailey, Stephens & Huettig
Attorneys United States Patent Office 2,884,692
Patented May 5, 1959

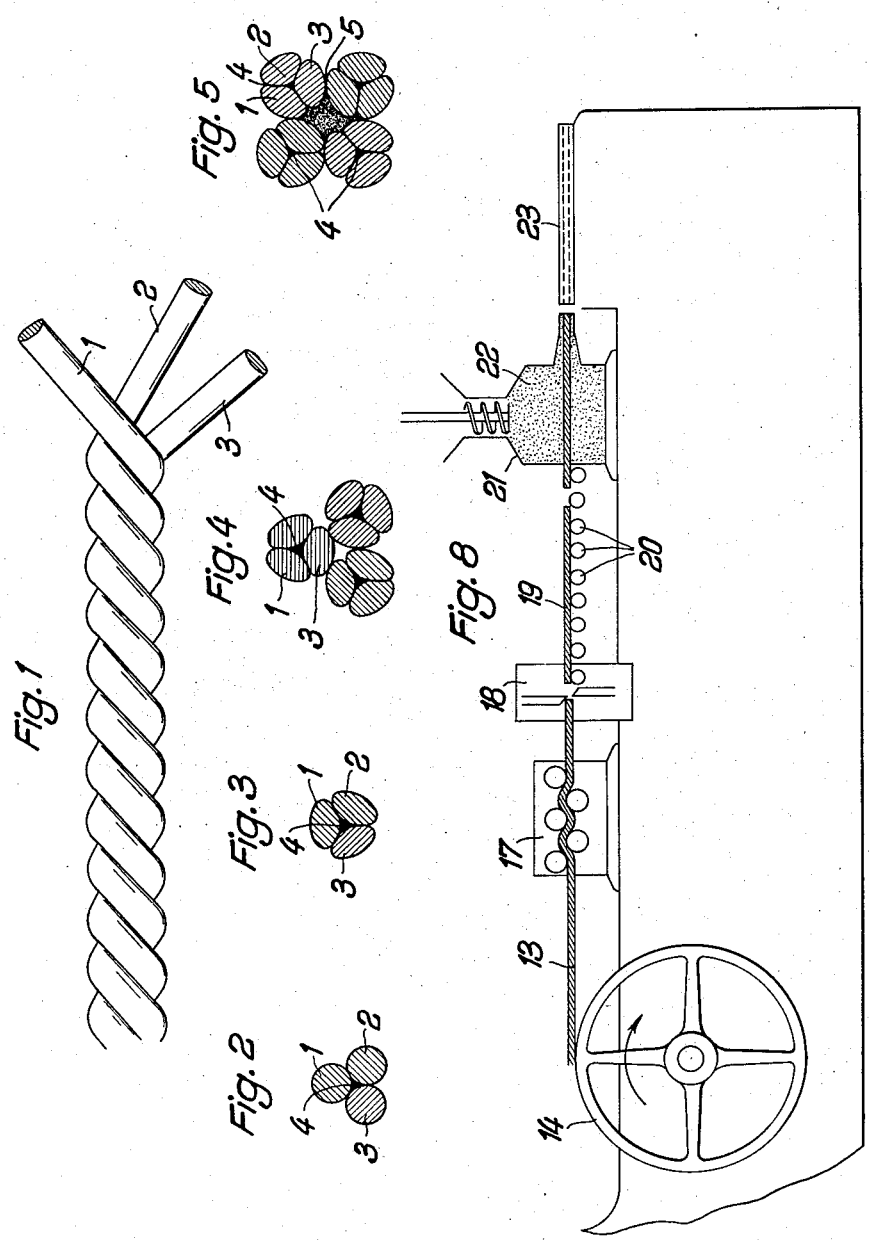

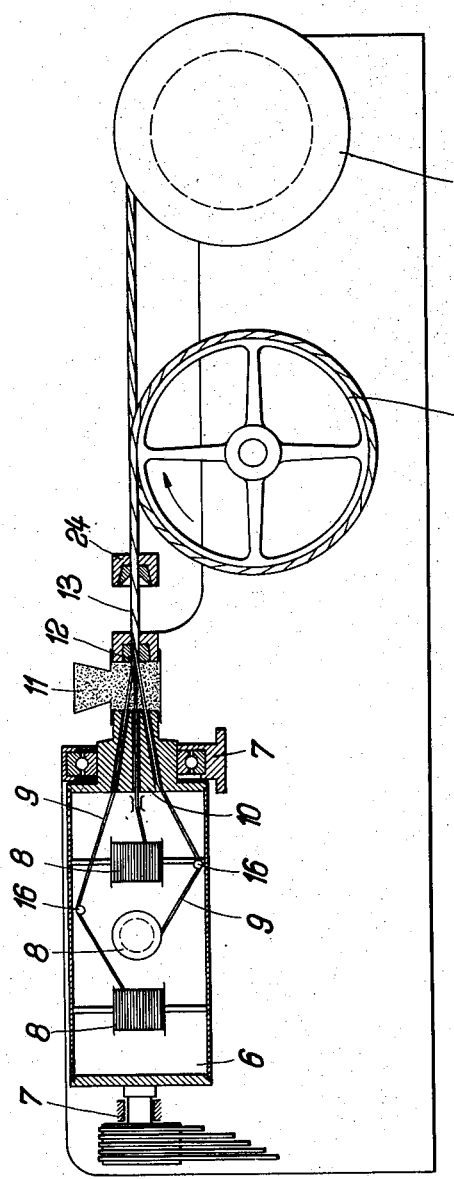

2,884,692

METHOD OF MAKING A TWISTED WIRE WELDING ELEMENT

Walter Haase, Frankfurt am Main, and Alfred Schussler, Frankfurt am Main-Heddernheim, Germany, assignors to Vereinigte Deutsche Metallwerke Aktiengesellschaft, Frankfurt am Main-Heddernheim, Germany, a corporation of Germany Application July 6, 1956, Serial No. 596,306

3 Claims. (Cl. 29—505)

This invention is directed to a process for producing welding and soldering rods and electrodes containing a flux compound for facilitating the welding or soldering operation.

This application is a continuation-in-part of our abandoned application Serial No. 365,144, filed June 30, 1953, for "Twisted Wire Welding Element." The object of this invention is to produce a flexible welding or soldering rod or electrode. A further object is to produce a flexible welding electrode which can be coiled on a spool or drum.

In general, these objects are obtained by twisting together a plurality of wires to form a strand having a hollow core, said core being filled with flux material. In the prior patent to Mattice, No. 1,361,269, the wires are twisted about a core wire, and little space remains for receiving flux material.

In a welding electrode as shown by Mattice, a satisfactory weld or solder cannot be obtained because the flux pre-maturely escapes from the electrode. This happens because the individual wires splay out at the welding end, the flux thus being freed and consequently flows out. According to the instant invention, the flux is tightly held in the core of the electrode until consumed.

In the instant invention, the individual wires are not only twisted into strands as in Mattice, but at the time of twisting the wires are deformed and tightly pressed together against each other to form a hollow core into which powdered flux is placed. A concentric and inwardly directed pressure is attained which is great enough to strongly solidify the flux. The stranding of the wires is carried out in an apparatus which deforms the wires into reduced cross-sections while being stranded. After the strand has been formed, it can be pulled through a second die to further compress the wires.

In this invention, the surfaces of the individual wires contact each other to form a tightly closed hollow core. The flux is therefore protected from being destroyed or decomposed by the humidity of the atmosphere.

A surface coating can be given the electrodes to protect atmospheric oxygen from reaching the molten metal forming a weld while the flux dissolves the oxides in the molten metal. The flux is applied to the center of the molten metal and further permits the electrodes to have a firmly adhering coating. The electrodes are usable in all kinds of welding operations, and in semi- or fully automatic welding operations.

The cross-section of the electrode can be very simple, all depending on the quantity of flux required. A particularly advantageous and economic construction is obtained by twisting three wires of any cross-section together.

The means by which the objects of the invention are described more fully with reference to the accompanying drawings in which:

Figure 1 is a side elevational view of an electrode of this invention with the wires separated at one end;

Figure 2 is a cross-sectional view through Figure 1 showing the individual wires prior to being deformed;

Figure 3 is a similar view after the wires have been stranded and deformed;

Figure 4 is a cross-sectional view of an electrode formed from three strands of Figure 3;

Figure 5 is a cross-sectional view of an electrode formed from four strands;

Figure 6 is a cross-sectional view through the electrode forming apparatus;

Figure 7 is an enlarged, detailed view of a portion of Figure 6; and

Figure 8 is a cross-sectional view through the electrode cutting and coating apparatus.

In Figures 1 to 3, the wires 1, 2, and 3 are twisted together to form a strand. At the time of twisting, or subsequent thereto, the wires are deformed from the circular section of Figure 2 and the cylindrical shape of Figure 3. A hollow core exists which is filled with flux material 4.

In Figure 4, a plurality of strands are twisted together in rope-like form so that in addition to the flux 4 contained in the individual strands, main hollow core 5 is formed by the strands, which may be filled with flux. In Figure 5, the same thing is illustrated with respect to the use of four individual strands. It is clear that larger cross-sectional areas can be produced by use of an even greater number of strands. In this respect, it is noted that the individual strands can be composed of various metals or alloys, and this can also be done in the three-wire electrode of Figure 1.

The apparatus for forming the electrodes is seen in Figures 6 and 7. A cylindrical drum 6 is mounted for rotation in bearings 7. Spools 8 contain the wires to be twisted together, these spools being positioned in container 6 so as to not change the gravitational or centrifugal conditions of the container when the wires are unwound. The wires 9 pass through twisting head 10 and enter a hollow chamber 11 containing flux material, and then go through closing die 12. The twisted strand 13 is then pulled on to a drum or passed to a further straightening, cutting, and coating apparatus. Within cylinder 6, the wires are passed over guide rolls 16.

Die 12 is stationary and acts both as a closing and wire deforming die. As wires 9 go through chamber 11, they are twisted, and the flux enters the central core by reason of the rotation of the wires and the simultaneous axial pull on the strands. A considerable quantity of flux, under great pressure, is thus placed in the core. From the detailed view of Figure 7, the wires coming through twisting head 10 are of circular section. Just prior to the die 12, the wires have been twisted together and are still of circular section as shown in Figure 2. As the wires go through die 12, they are deformed beyond their elastic limit into the elliptical shape of Figure 3. Within chamber 11, the wires are rotated in the direction of arrow B on an imaginary conical surface. The wires 9 continuously draw in flux. This flux is tightly compressed and sealed in by the die 12, the wires moving in the direction of arrow A. Due to the combined motions in the direction of arrows A and B, great radial forces are caused in the direction of arrow C, which force serves to pull in and compress the flux material. The wire coming from die 12 is pulled by wheel 14 and then coiled on drum 15. Further compression of the strand can be obtained by the use of a second die 24.

Electrodes for flash welding are obtained by the apparatus of Figure 8. From pulling wheel 14, the strand 13 is taken through an aligning mechanism 17 and cut by knives 18. The cut pieces 19 are conveyed by rollers 20 into a coating press 21 where they are given a coating of the material 22. The coated pieces 23 leaving the coating press constitute the completed electrodes.

The pitch of the twisted wires depends upon the cross-section in material of the wires, and can be varied by changing the speed of pulling wheel 14 and the speed of cylinder 6. The rod wound upon drum 15 is flexible and can be used in automatic welding machines.

The flux 4 normally consists of a welding powder which dissolves the oxides, and is composed of borax and boric acid.

The coating material 22 is composed of magnetite, rutile, basalt, chalk, cryolite, glycerin or magnesium powder.

Having now described the means by which the objects of the invention are obtained, we claim:

1. A process for the production of welding electrodes comprising twisting a plurality of wires together to form a strand having a hollow core, simultaneously filling the core with powdered flux and deforming the cross-sections of the individual wires of the strand beyond their elastic limit to compact the powdered flux into a substantially solidified core with the wires being in such a tight twisted engagement with each other that their free ends will not splay on burning the electrode and the flux will not escape prematurely from the core.

2. A process as in claim 1, further comprising additionally compressing said wires subsequent to twisting them into a strand.

3. A process as in claim 1, further comprising applying a protective coating to the exterior of the strand.

References Cited in the file of this patent

UNITED STATES PATENTS

| | | |
|---|---|---|
| 1,361,269 | Mattice | Dec. 7, 1920 |
| 2,427,507 | Powell et al. | Sept. 16, 1947 |
| 2,683,207 | Lewis et al. | July 6, 1954 |